United States Patent [19]

Hunt

[11] 4,046,385

[45] Sept. 6, 1977

[54] RECORD PLAYERS

[75] Inventor: Brian Keith Hunt, Highworth, England

[73] Assignee: Plessey Handel und Investments AG, Zug, Switzerland

[21] Appl. No.: 639,479

[22] Filed: Dec. 10, 1975

[30] Foreign Application Priority Data

Dec. 18, 1974 United Kingdom ............... 54817/74

[51] Int. Cl.$^2$ ............................................. G11B 17/12
[52] U.S. Cl. .................................................. 274/10 R
[58] Field of Search ..................................... 274/10 R

[56] References Cited

U.S. PATENT DOCUMENTS

| | | | |
|---|---|---|---|
| 2,902,285 | 9/1959 | Knecht | 274/10 R |
| 2,906,537 | 9/1959 | Dale | 274/10 R |
| 3,468,547 | 9/1969 | Draper | 274/10 R |
| 3,507,503 | 4/1970 | Freier | 274/10 R |
| 3,827,697 | 8/1974 | Miyoshi | 274/10 R |
| 3,848,875 | 11/1974 | Miyoshi | 274/10 R |
| 3,885,798 | 5/1975 | Yokokura | 274/10 R |

Primary Examiner—Steven L. Stephan
Attorney, Agent, or Firm—Fleit & Jacobson

[57] ABSTRACT

A record player comprises a motor-driven turntable having an associated general pick-up arm assembly and a control mechanism which includes a main cam serving not only for controlling movement of the pickup arm both during automatic operation of the player and during manual cueing. During a final part of its revolution, the main cam is detached from its positive drive and driven by preloaded spring means, its rotation being damped as by means of a liquid damping arrangement embodying part of the cam or by a frictional damping system in order to provide slow lowering of the pickup arm on to a record surface without the necessity for introducing a separate damping device between the cam and the pick-up arm as has heretofore been the practice.

9 Claims, 7 Drawing Figures

RECORD PLAYERS

This invention relates to record players including record changers and is directed to constructional innovations which afford substantial advantages including much improved standardisation of record player mechanisms.

In various known constructions of a record player, movements of the pick-up arm are controlled by means of a rotatable main cam gear forming part of a control mechanism dispersed over the underside of the turntable base structure. For providing vertical movement of the pick-up arm the main cam gear usually actuates the pick-up arm through a secondary cam and associated linkage with the intervention of suitable damping means to ensure slow lowering of the pick-up arm on to the record surface.

The record player also includes in addition to the main cam gear further movable control members for performing various functions during operation of the player. For instance the player may include, in addition to the aforesaid main cam gear; a pivoted cam follower for producing pivotal movement of the pick-up arm across the turntable after a record playing operation has been completed; a programme control lever for selectively controlling "manual" or "automatic" player operation; a cueing lever for raising and lowering the pick-up arm; and a record size selector arm for presetting the player to play records of different sizes (e.g. 7 inches, 10 inches and 12 inches). These movable control members for controlling various functions of the record player have hitherto been attached to the underside of the turntable base structure which is used as the mounting plate for the control mechanism at widely dispersed locations predetermined by the design of the particular unit plate with which the mechanism is to be associated.

It will be readily appreciated therefore that different constructions or designs of turntable unit plate or other base structure for different record player models necessitate modifications not only to the location for mounting the various movable control members, but also to the actual construction and dimensions of these control members required by the interaction between at least some of these control members.

The present invention is based upon the realisation that substantially improved standardisation of record player mechanisms with consequent reduction in manufacturing costs or record players may be achieved by providing a control mechanism for use in a record player comprising a motor-driven turntable mounted on a base structure, and a pick-up arm pivotally mounted on said base structure for movement over the turntable, said control mechanism comprising a multiplicity of movable control members operable for controlling the operation of the player, and including a rotatable cam gear providing a plurality of cam surfaces, and associated cam follower means for producing vertical and pivotal movement of the pick-up arm during playing operations, said movable control members being compactly arranged on mounting plate means to define a unitary sub-assembly which is constructionally substantially independent of the form of turntable base structure and which can be secured to said base structure with only simple mechanical connections being required between said control mechanism and the turntable/base structure assembly.

As will readily be understood the control mechanism provided by the present invention may therefore be used with turntable base structures of widely varying forms since the control mechanism is substantially constructionally independent of the form of turntable structure, and only minor details, such as control or connecting links between controls mounted on the base structure and the control mechanism, need vary for differing record player models.

In carrying out the invention the main cam gear may have teeth missing over part of its periphery in order to facilitate the interruption of drive to said cam gear by driving gear means when vertical movement of the pick-up arm is required the part of its periphery having no teeth extending for a sufficient length backwards from the normal rest position of the cam gear to render the cam gar independent of its positive drive from the drive pinion during that part of its revolution in which the pickup arm is put down on the record in order to commence playing, energy stored in loaded spring means is utilised instead to drive the main cam gear to effect this vertical movement of the pick-up arm through a cam follower member. A pinion for driving the main gear may be adapted to be driven by means of an endless toothed belt from the turntable mounted on the base structure.

The cam follower means referred to above may comprise a spring blade which follows the contours of a cam surface on the main cam gear to provide raising and lowering of the pick-up arm.

The mechanism may also include a pivoted cueing lever which in response to the displacement thereof by the actuation of a manually-operable lever provided on the base structure of a player, causes reverse rotation of the cam gear from an indexed position at the main cam gear through a relatively small angle against the action of and loaded spring means in order to effect lifting of the pick-up arm, the restoration of the manually-operable lever to free said cueing lever allowing energy stored in said spring means during cam rotation through said relatively small angle to be utilised to return the cam in the reverse direction to its indexed position thereby effecting a lowering of the pick-up arm. The cueing lever may comprise a pivoted lever having a cam surface arranged to bear against a rib formed around the cam periphery to rotate the cam gear in response to operation of the manually operated lever.

The cam means may also comprise a pivoted cam follower lever which follows a cam surface on the cam gear to produce pivotal movement of the follower in response to rotation of the cam and thereby to produce at the end of a record playing operation pivotal movement of the pick-up arm over the turntable through a simple mechanical connection. This pivoted cam follower lever may also be arranged to be connected by a simple mechanical link to a record release mechanism of a player providing for automatic playing operation so that the cam follower lever can sense the presence of one or more records on a storage part of the turntable spindle and also effect release of a record therefrom at the end of a record playing operation.

A control mechanism according to the invention for a player providing automatic record playing may comprise a pivoted programme control lever capable of moving to one of a number of discrete positions corresponding to manual or auto positions through a simple mechanical linkage connecting the programme control lever to a programme selector switch which will be provided on the base structure of the player, said programme control lever having projections thereon which are appropriately positioned in the path of an actuator carried by the cam gear to provide the requisite playing programme control. The pivoted programme control lever may be deflected to an "intermediate" position between manual and automatic after playing of the first record of an automatic operation has been completed, so that if the cam follower lever senses no further record on the centre spindle storage part, the programme control lever is displaced by the cam follower lever into its manual position in readiness for engagement by the actuator on said cam gear to effect switch-off of the player after the final record playing operation. The programme control lever may be arranged to be displaced beyond the manual and automatic position so that projections on the control lever are out of the path of the actuator on the cam gear by moving the programme selector switch to a "repeat" position whereupon the record player continues to go through a series of repeat cycles of operation.

For the purpose of operating the cam gear, a trip mechanism is provided which is pivotally mounted on the main cam gear and arranged to be tripped in response to movement of the pick-arm into a lead-off groove at the end of a record to cause engagement of rotating driving means, such as a pinion drive wheel driven by an endless belt, with the cam gear to cause the cam gear to go through one complete cycle of operations. The cam gear is started into rotation when the trip mechanism engages with a striker on a pinion drive wheel in order to angularly displace the cam gear through a small angle sufficient to cause the pinion teeth to mesh with teeth on the cam gear.

The control mechanism may also include a pivoted record size selector arm which is pivotally movable into discrete positions whereby inward pivotal movement of the pick-up arm over the turntable is arrested during automatic playing by stepped surfaces of the selector arm which are selectively moved into the path of the pick-up arm stop lever in response to the operation of the record size selector switch on the base structure arranged to be mechanically linked to the record size selector arm.

When a programme selector is provided, a pivoted impulse lever may also be provided which is arranged to be momentarily actuated from an impulse switch on the base structure through a simple control link when the programme selector switch is operated to automatic play position, the impulse lever producing operation of a trip mechanism to produce an initial cycle of operations of the cam gear to raise the pick-up arm and swing it across to a position above the lead-in groove of the record.

The cam gear of the control mechanism may be damped against rotation thereof by means of a viscous liquid and/or friction damping arrangement. This arrangement preferably comprises a cup-shaped part of the mounting plate means of the mechanism which receives a boss provided on the cam gear, the end surface of the boss being pressed towards the base of the cup-shaped member by spring means preferably acting on the cam gear with one or more washers impregnated with viscous liquid being interposed between the cam and the cup-shaped part. The spring pressure exerted on the cam gear may be varied by suitable adjustment of adjuster means thereby to vary the degree of damping on the cam gear.

The present invention also provides a record player which embodies a control mechanism of the form set out in the preceding paragraphs.

According to another aspect of the present invention a record player is provided comprising a base structure, a motor-driven turntable mounted on the base structure and a pick-up arm pivotally mounted on the base structure, a cam gear and associated cam follower means mounted on the underside of the base structure for controlling movements of the pick-up arm both across the turntable and in a vertical direction during pick-up arm lifting and lowering procedures, in which the cam gear is itself damped for rotation thereof by means of a viscous liquid and/or friction damping arrangement. The viscous liquid and/or friction damping arrangement may be of the same form as described in the penultimate paragraph.

The turntable of the record player may be belt driven but inter-wheel drive may alternatively be provided. Still further, the turntable may form an integral part of the driving motor in which case it may be convenient to drive the main cam gear from a servo-motor.

By way of example one embodiment of the present invention will now be described with reference to the accompanying drawings in which.

Referring to the drawings, the record player comprises a turntable 1 which may be drawn from sheet steel by a single drawing operation to provide in the present example a depending circular wall 2 engaged by a turntable driving belt shown at 3 which drives the turntable 1 from a small electric motor 4 secured to a metal unit plate 5 on which the turntable 1 is mounted. The player also comprises a pick-up arm 7 pivoting on an arm mounting structure 8 secured to the plate unit plate 5.

Figure 7:
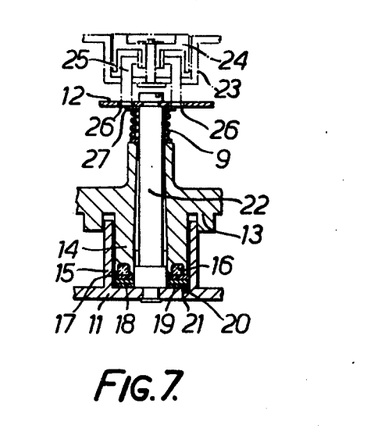

In accordance with the invention, vertical and angular movement of the pick-up arm 7 as well as other operations of the player are controlled by a control mechanism 10. This control mechanism 10 takes the form of a compact unitary sub-assembly which has a lower die-cast mounting plate 11 and a top mounting plate 12, and the assembly is secured, as by screws, to the underside of the unit plate 5. This control mechanism sub-assembly embodies a main cam gear 13 preferably moulded from plastics material, which as can best be seen in FIG. 7, is rotatably mounted on a spindle 22 and includes a central hollow boss 14 which is received by an upstanding cup-shaped part 15 of the die-cast mounting plate structure 11. The bottom surface of the boss 14 is formed with an annular groove 16, which contains viscous liquid and is closed by means of a perforated plastics washer 17 secured to the cam boss. The viscous liquid seeps very slowly through the perforated washer 17 on to a felt washer 18 which is free to rotate between the perforated washer 17 and a plastics washer 19 which is prevented from rotating by means of a projection 20 engaging an indentation 21 in the base structure 11. The main cam gear and washer assembly is put under compression by means of a coil spring 9 which embraces the top end of the cam mounting spindle 22 and exerts axial pressure on the cam gear. The viscous-liquid and frictional interaction between the washers 17, 18 and 19 produces damping of rotation of the main cam gear in the cup-shaped part 15. The compression of the spring 9 and thus the degree of damping can be adjusted to suit requirements by means of an adjuster device 23. This adjuster 23 comprises a rotatable screw threaded member 24 which is threadingly engaged by a double-pronged fork member 25 the prongs of which project into holes 26 in the mounting plate 12. In response to rotation of the member 24 the fork member 25 moves in the axial direction of the cam gear 13 so that the prongs, acting through end washer 27, compress still further, or relieve compression in the coil spring 9. Thus damping of the cam gear rotation will be increased or decreased, as the case may be.

This damping of the cam movement as has previously been explained serves to produce slow controlled vertical movement of the pick-up arm 7 when the cam gear is driven by pre-loaded spring means during lowering of the arm on to a record surface.

As will hereinafter be apparent, the main cam gear 13 controls various movements of the pick-up arm 7 and is also arranged for controlling actuation of the usual record release mechanism embodied in the centre spindle and used during automatic playing of the player. The main cam 13 has teeth 28 over the major part (e.g. 340°) of its periphery and is arranged to perform one revolution each time the mechanism is tripped during operation of the player by being driven, during a major part of each revolution, through a pinion wheel 29 rotated continuously during rotation of the turntable 1 by means of a tooth belt 30 driven from boss 31 on the turntable 1. During the said major part of each revolution, the rotation of the cam gear is arranged to increase the loading of said pre-loading spring means, and the energy thus stored is subsequently used to drive the cam gear for the remaining part of its revolution.

It is convenient at this juncture to describe the different modes of operation of the record player so that various parts thereof not yet referred to can be introduced as they come into play during such operation.

Figure 1:
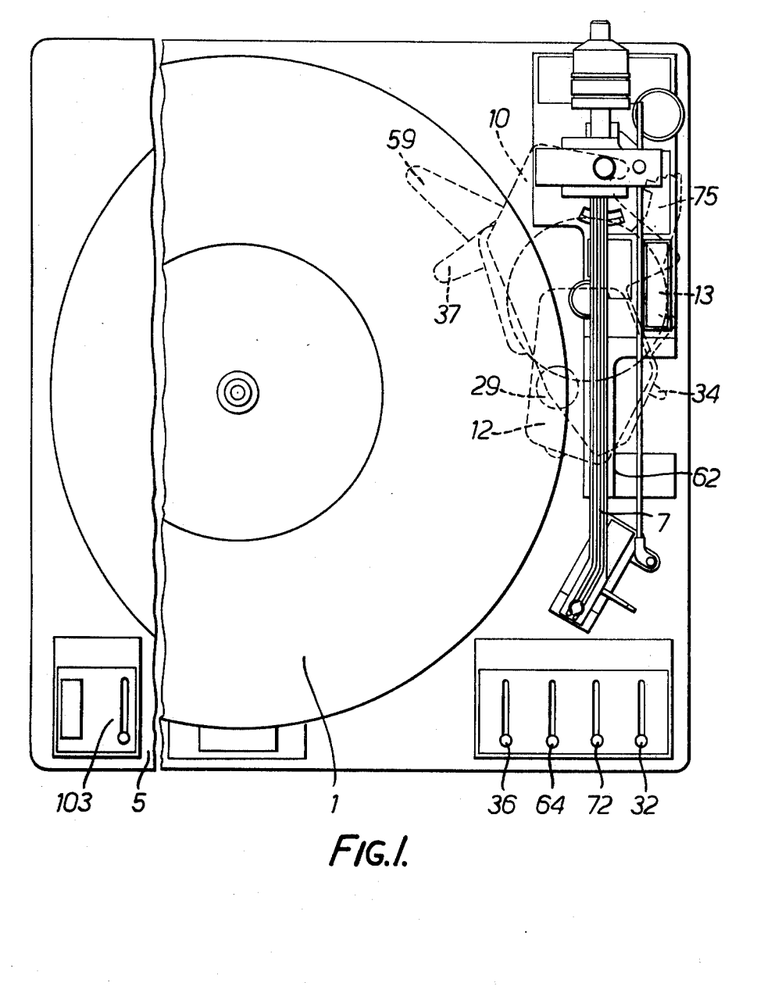
FIGS. 1 and 2 are plan and underneath views respectively of a record player constructed in accordance with the present invention.
Figure 2:
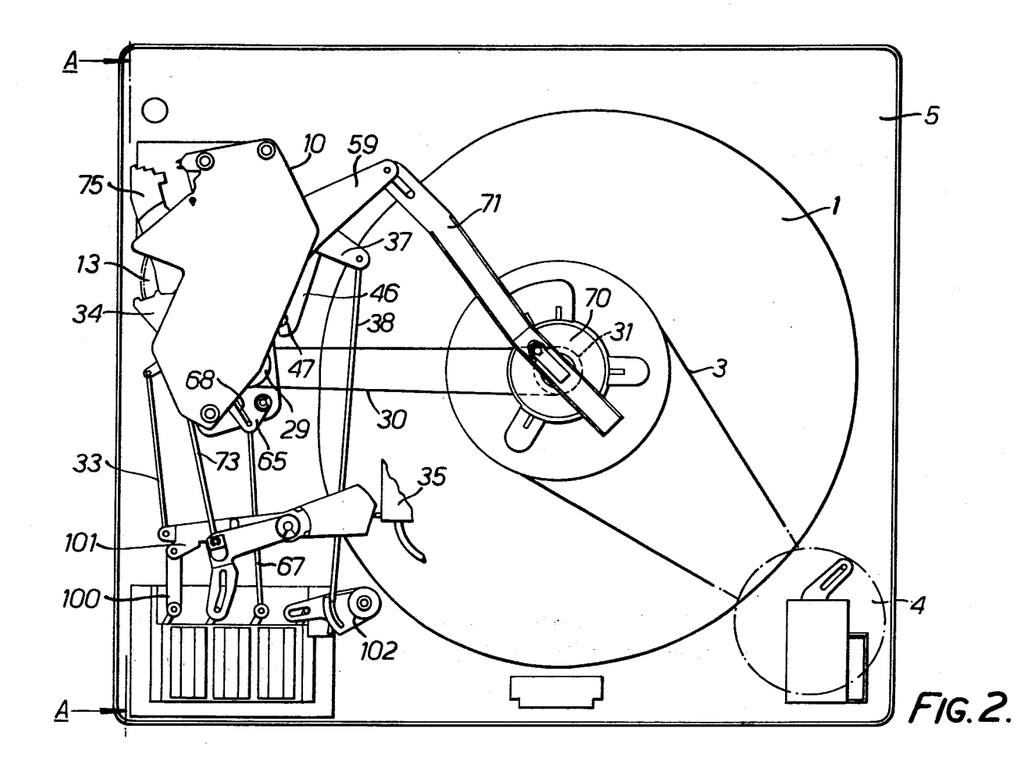
Figure 3:
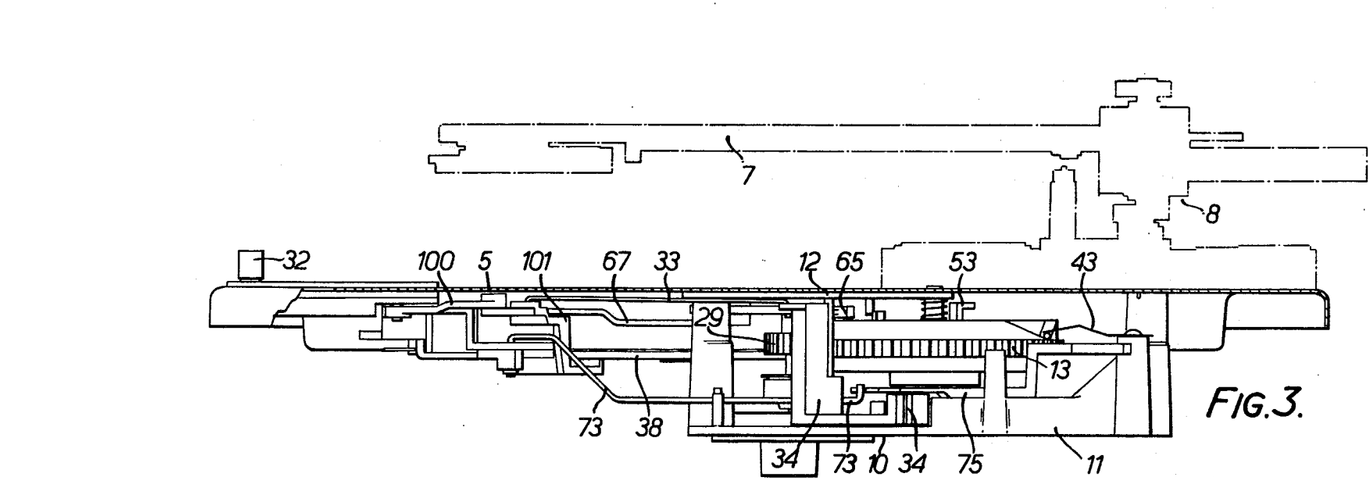
FIG. 3 is a cross sectional view of the record player taken along the line A—A of FIG. 2.
Figure 4:
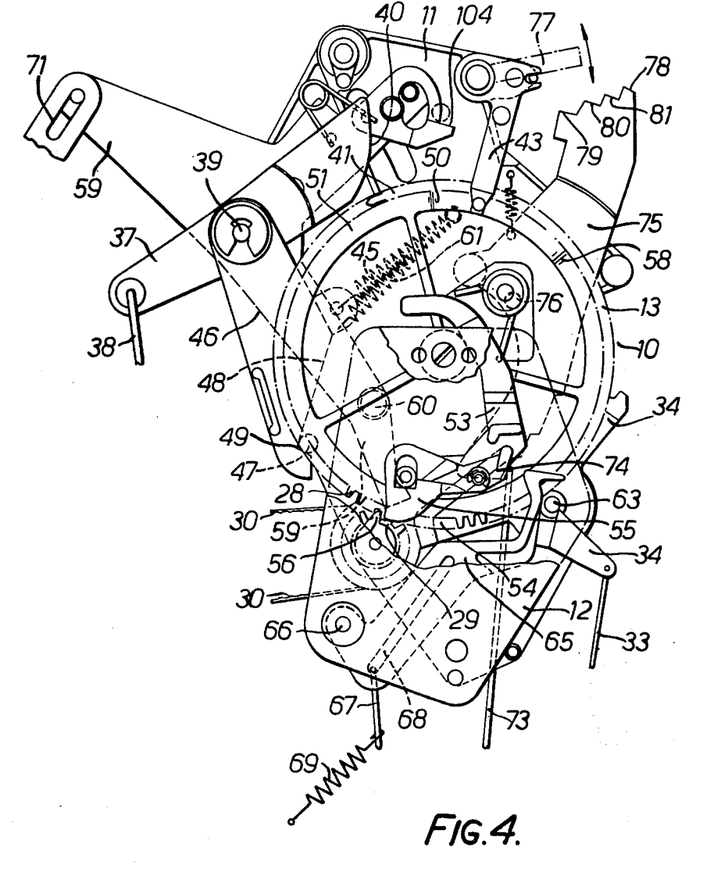
FIG. 4 is a plan view of the control mechanism sub-assembly of the record player of FIGS. 1 to 3.
Figure 5:
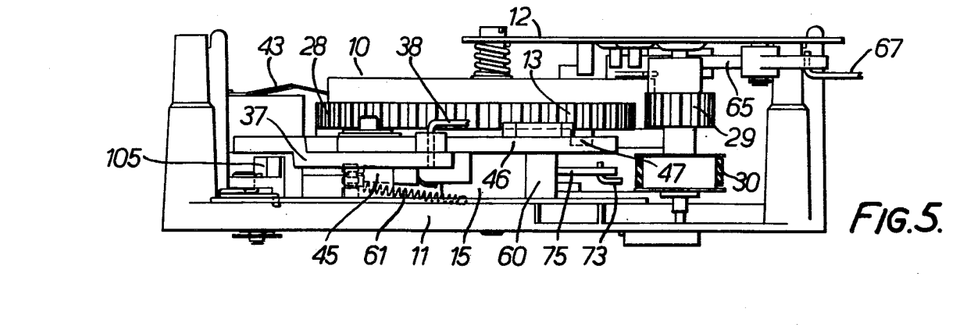
FIGS. 5 and 6 are elevations of the control mechanism of FIG. 4 when viewed from the left and right hand sides respectively; and, FIG. 7 is a fragmentary cross-sectional view of a cam gear forming part of the control mechanism sub-assembly in FIGS. 1 to 6.
Figure 6:
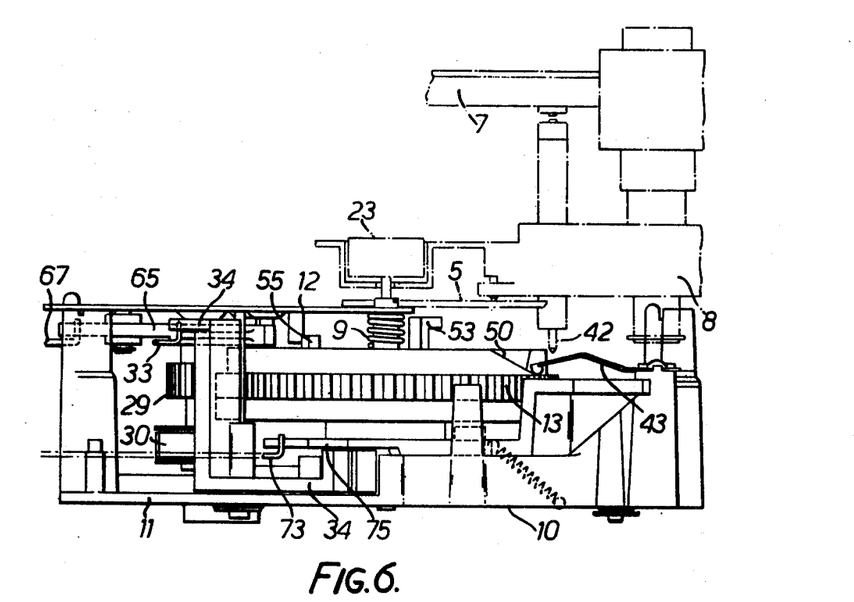

For the manual operation of the record player, a selector switch 32 mounted on the front of the unit plate 5 and acting through a link 100, a floating lever 101, and a wire control link 33 upon a pivoted programme control lever 34 of the control unit 10, will be moved to the "manual" position so that a switchf 35 will be operated by the movement of the floating lever 101 to start the turntable drive motor 4. A turntable speed selector switch 103 is provided on the front of the unit plate 5. The pinion 29, which is driven from the turntable 1 by an endless belt 30, does not at this stage engage with the teeth of the main cam 13 to rotate the cam. The pick-up arm 7 may now be lifted manually from its rest support 62 and lowered on to a record to be played. Alternatively, a cueing lever 36 may be operated to cause a pivoted cueing arm 37 of the control unit 10, coupled to the lever 36 by a wire control link 38 and a swivel link 102, to be rotated about a pivot 39 (FIG. 4) so that a cam surface 40 of the lever 37 engages one end of a rib 41 on the underside of the main cam 13 and by so doing rotates the cam backwards (that is to say clockwise in FIG. 4 or in a direction opposite to the direction of rotation of the cam 13 for pick-up arm control during operation of the player) through a angle of, for example 20°, permitted by the width of the gap between teeth above referred-to, from its indexed position as shown in the drawings. As to a cueing position. A ramp 50 is so arranged on the upper cam surface 51 near the cam periphery that, as the cam moves to the cueing position a pick-up arm lifting pin 42 (FIG. 6) is raised through the action of a lifting blade 43, which rides up the ramp 50. In this manner the pick-up arm 7 is lifted from its rest support 62. At the same time the rotation of the main cam 13 produced by the cueing arm 37 loads a coil spring 45 which biasses a cam gear indexing lever 46 against a spigot 47 formed integrally with the cam gear 13, the loading of the spring 45 resulting from the spigot 47 deflecting the lever 46 as viewed in FIG. 4 counterclockwise about pivot 39 which is common to the cueing arm 37 and the indexing lever 46, as the spigot 47 moves along cam surface 48 of lever 46. This loading of the spring 45 tends to return the main cam gear 13 to its indexed position as shown in FIG. 4 with the spigot 47 located in the V-shaped notch 49 of lever 46. While the cam is in the cueing position, the pick-up arm 7 may be moved over the record to a position above the lead-in groove of the record on the turntable 1 or to any other desired position over the record. When the cueing lever 36 is then restored to its initial position, the pivoted cueing arm 37 moves out of the path of the rib 41 on the main cam gear 13 and thereby allows the cam to move back to its indexed position under the action of the loaded spring 45 upon the cam indexing lever 46 which bears on spigot 47 of the main cam gear. As the cam gear moves back from its cueing position to its indexed position, the spring blade 43 moves down the ramp 50 of cam surface 51, and the lifting pin 42 (FIG. 6) follows the spring blade 43 so that the pick-up arm 7 is lowered on to the record surface. Movement of the cam throughout this lowering operation of the pick-up arm is damped by the restraint imposed on the cam 13 by the viscous liquid damping arrangement described above with specific reference to FIG. 7 of the drawings. When the main cam gear 13 has returned to its indexed position as shown in FIG. 4, it is arrested by the spring-loaded indexing lever 46 when the spigot 47 engages the notch 49.

The pick-up arm 7 is now supported by the pickup stylus and moved by it across the record during playing of the record until the stylus reaches the lead-off groove at the end of the record whereupon a lever carried by a pickup-arm spindle at the underside of the unit plate 5 engages with a pivoted lever 53 of a trip mechanism mounted on the top of the cam 13 so that a trip lever 55 is deflected into the path of a striker 56 provided on the rotating pinion 29. As the striker 56 engages with the trip lever 55, it turns the cam gear 13 in counterclockwise direction, overcoming the indexing force exerted upon the cam gear by the spring-urged indexing lever 46, to bring the teeth 28 of the cam gear into mesh with the teeth of the pinion 29 so that the cam now commences a complete cycle. As the cam cycle commences, the lifting blade 43 rides up ramp 58 of the associated cam surface 51 and lifts the pick-up arm 7 through lifting pin 42 from the record surface. As the cam gear 13 rotates further, a generally T-shaped cam follower lever 59, which is also pivoted at 39, and which includes a pin 60, riding on a peripheral cam surface of the main cam gear located below the toothed part of the cam gear as viewed in FIG. 4, is actuated by the cam gear 13 against the action of a biassing spring 61 to swing the already raised pick-up arm 7 back over the record to a position above the pick-up arm rest support 62. When the cam gear 13 has been rotated through about 340° of its cycle, the pinion 29 disengages from the cam since the last part (e.g. 20°) of the cam circumference indicated at 54 is without teeth. However the cam gear 13 continues to rotate as previously explained in connection with the cueing operation of the pick-up arm, so that under the action of the spring-urged cam-indexing lever 46, which has been raised by the rib 41 due to the rotation of the cam gear 13, the cam completes its revolutions to reach again its indexed position while thus driven by the spring 45, the cam gear being under restraint of the viscous liquid damping arrangement, and during this final part of the cam cycle, the spring blade 43 moves down the ramp 50 of cam surface 51 so that the pick-up arm 7 is lowered slowly down on to the arm rest support 62. The turntable driving motor 4 is switched off just prior to the lowering of the pick-up arm 7 and for this purpose, the tail end of a spring secured to the cam gear 13, is arranged to deflect the programme control lever 34 about its pivot 63 so that the manual, automatic and repeat selector switch 32 which is connected to the programme lever 34 through control rod 33 is returned to the 'off' position and the resulting movement of the control rod 33 switches off motor energisation switch 35 through floating lever 101.

In the case of an automatic changing operation of the player, the selector switch 32 will be moved to the automatic position so that the control mechanism sub-assembly will be programmed for automatic play by positioning of the programme control lever 34. The turntable motor 4 is again energised, as already described for manual operation, by the action of control rod 33 and link 101. The turntable 1 starts to rotate, and momentary operation of an "impulse" switch 64 on the unit plate 5 then causes an impulse arm 65 pivoted at 66 to be rotated counter-clockwise under the action of an actuating rod 67 linked to the switch 64 and having a vertically deflected end part moving in a slot 68 in the arm 65. Pivotal movement of the arm 65 causes trip member 55 to move into the path of the striker 56. The rotating pinion 29 accordingly meshes with the teeth of the main cam 13 as for manual operation previously described so that the cam gear 13 now starts to rotate in a counter-clockwise direction as viewed in FIG. 4. When the impulse switch is released, the impulse arm 65 returns to its normal position under the action of a coil return spring 69 acting on actuating rod 67. The impulse switch 64 on the unit plate 5 also returns to its normal position. As the main cam gear rotates from its indexed position, the pick-up arm 7 is lifted off its rest support 62 as a consequence of the spring blade 43 riding up ramp 58 of associated cam surface 51. During a subsequent dwell period provided by the cam surface 51, a record will be released from the record storage section of the centre spindle of the player on to the turntable 1 by the main cam gear 13 operating a record release mechanism 70 of any convenient form through the actuation of the above-mentioned cam follower lever 59, which for this purpose is linked to the record release mechanism by an actuating link 71. Pivotal movement of the cam follower lever 59 as the cam gear 13 rotates causes, after the operation of the record-release mechanism 70, the pick-up arm 7 to swing across the turntable to a pre-selected position according to the position of a record size selector switch 72 which is located on the face of the unit plate 5 and which provides for selective automatic playing of records of 7 inch, 10 inch or 12 inch diameter. The record size selector switch 72 positions a rod 73, of which an upturned end 74 moves a size selector arm 75, pivoted at 76, to selected steps. In the manual position of the player, the upturned end 74 will locate the arm 75 in an inoperative position in which an abutment pin 77 on the shaft of pickup arm 7 moves clear of an end surface 79A of the selector arm 75.

In automatic playing, the pin 77 on the pick-up arm 7 will engage a surface step 79 of the arm 75 if the record size selector switch 72 is moved to the 7 inch record position, a further surface step 80 for 10 inch record position, or a third surface step 81 for 12 inch record position, so that the inward movement of the arm over the turntable will be respectively terminated by the selected surface step. The cam gear 13 continues to cycle, and during the last 20° of its cycle, the pick-up arm 7 is lowered slowly on to the lead-in groove of the record on the turntable as the cam 13 is moved-on to its indexed position by the spring-urged lever 46, movement of the cam being damped by the viscous liquid damping arrangement during this pick-up arm lowering operation. As during the playing of the record the pick-up arm 7 moves across the record following the record groove, the cam gear 13 is stationary in its indexed position, and as previously described in the case of manual operation, when the pick-up arm 7 reaches the lead-off groove at the end of the record, the previously referred to lever carried by the spindle of the pick-up arm 7 displaces the trip member 55 on the main cam into the path of a striker 56 on the pinion 29. As a consequence a further cam cycle is initiated. The pick-up arm 7 is accordingly lifted from the record and then swings back across the record to a location above the pick-up arm support 62. If the presence of one or more further records to be played on the centre spindle is sensed by the cam follower lever 59 through the link 71, the centre spindle record release mechanism 70 is actuated by the pivoted cam follower lever 59 and associated link 71, to release a further record from the storage part at the top of the centre spindle on to the turntable 1, whereafter the pick-up arm 7 swings back into a position immediately above the lead-in groove of the released record in readiness for the arm 7, and will then be lowered slowly down on to the record surface as the main cam completes the final part of its cycle. The programme selector lever 34 is indexed into an intermediate position between its automatic and manual positions at the end of the first automatic cycle so that when the cam follower lever 59 through its associated link 71 senses the absence of a record on the storage part of the centre spindle, it will cause the programme control lever 34 to assume its "manual" position in readiness for effecting a switch-off when the last record released on to the turntable has been played. Thus the programme control lever 34 remains in the intermediate position until all records have been released from the centre spindle whereupon it is moved to the manual position for the playing of the last record on the turntable. When the cam gear 13 is triggered at the end of the play of this last record, the abutment pin 77 will strike a terminal surface step 78 on the arm 75, so that the pick-up arm 7 will remain over the arm rest support 62 until the main cam 13 completes the last part of its cycle, whereupon the arm 7 will be lowered on to the rest support 62 and the turntable motor 4 switched off by the operation of switch 35 by the programme control lever 34 returned to its 'off' position as previously described in the case of manual control.

The record player also provides for a repeat operation. This repeat operation is initiated by operation of the programme selector switch 32 to a repeat position in which it causes the programme control lever 34 to be moved to a position where the lever 34 is out of the path of the lever deflecting spring tail on the main cam 13 and so allows the player to carry on cycling. When further repeat is no longer required, the selector switch 32 is simply moved back to the manual position so that the player will be switched off when the last-commenced record playing operation has been completed.

Although in the specific embodiment described the turntable is belt driven from motor 4, it should be understood that other turntable driving means may be employed. For instance, the turntable may be driven through an interwheel drive, or the turntable may form or be attached to the rotor of a direct drive motor. Also the driving means for the main cam gear 13 may comprise a servo motor drive instead of the belt drive from the turntable for the pinion.

As will be appreciated from the foregoing description of one specific embodiment of the invention, the main cam gear 13 and various other control members of the record player such as the cam follower lever 59, the cueing arm 37, the programme selector lever 34 and the record size selector arm 75, all form part of the compact unitary control mechanism 10 which is substantially constructionally independent of the general turntable base structure since only simple mechanical links need to be provided between the various control mechanis parts and the switches, turntable and motor of the record player. Consequently the same control mechanism may be used with turntable base structures of widely varying forms and constructions thereby contributing greatly to the standardisation of record player parts and to substantially reduced manufacturing costs. Moreover, since the main cam gear is itself damped instead of employing a separate damping device located between the main cam gear and the pick-up arm manufacturing costs of the player are reduced still further.

What we claim is:

1. A control mechanism for use in a disc-record player having a unit plate, a motor-driven turntable mounted on said unit plate for rotation about an axis perpendicular thereto and having a record-supporting surface, a pickup arm, a pickup-arm carrier structure on which said pickup arm is mounted for pivotal up and down movement away from and towards said surface of the turntable, said pickup-arm carrier structure being equipped with a pickup-arm spindle extending through the unit plate for pivotal operation to move the pickup-arm across the turntable surface, and a pickup-arm lifting element, also extending through the unit plate, for operation to produce such pivotal up-and-down movement of the pickup arm; said control mechanism comprising: a cam gear having a ring of teeth and two cam surfaces which are rotatable with the cam gear and include a first cam surface controlling such up-and-down pivotal movement of the pickup arm and a second cam surface controlling such pivotal movement of the pickup arm across the turntable surface; a pinion rotatably mounted for driving engagement with said ring of teeth, the ring of teeth having, at a predetermined point of its circumference, a gap between successive teeth, wide enough to allow said pinion when facing said gap to rotate without driving the cam gear, said gap determining a position of rest for the cam gear; means for driving said pinion in a predetermined direction determining a forward direction in which the cam gear is driven by said pinion; trip means operable to produce movement of the cam gear in said forward direction from said position of rest through an angle sufficient to ensure engagement of said pinion with the teeth of said ring of teeth; and indexing means for opposing movement of the cam gear from said position of rest, - wherein the said first cam surface has a first ramp, operative, during the initial part of the forward rotation of the cam gear from a said position of rest, for lifting the arm away from said surface of the turntable to a raised position, a holding portion, following this first ramp and operative, during a subsequent part of such forward rotation, to maintain the arm in said raised position, and a second ramp, following said holding portion and operative after said holding portion, during a final part of the cam-gear movement before said position of rest is reached again, to allow the arm to move down from said raised position towards the turntable surface, the said first cam surface being so arranged that when the cam gear is in said position of rest, its said first cam surface can, while said pinion faces said gap, be rotated from said position of rest in a reverse direction, opposite to said forward direction, by an amount sufficient for said second ramp to move the pickup arm to said raised position, the mechanism further including a cueing member operable when the cam gear is in said position of rest, to produce such rotation of said first cam surface in said reverse direction; return spring means for returning said first cam to the said position of rest in said forward direction when said cueing member is released; and damping means operative to damp such return movement.

2. Mechanism as claimed in claim 1, for use in a record player whose turntable carries a coaxial toothed pulley, wherein the pinion is also equipped with a toothed pulley so that it can be driven by an endless toothed belt from said toothed pulley of the turntable of such record player.

3. A control mechanism for use in a disc-record player having a unit plate, a motor-driven turntable mounted on said unit plate for rotation about an axis perpendicular thereto, a pickup arm, a pickup-arm carrier structure on which said pickup arm is mounted for pivotal up-and-down movement away from and towards the surface of said turntable, said pickup-arm carrier structure being equipped with a pickup-arm spindle extending through the unit plate for pivotal operation to move the pickup arm across the turntable, and a pickup-arm lifting element, also extending through the unit plate, for operation to produce such pivotal up-and-down movement of the pickup arm, said control mechanism comprising: a cam gear having a ring of teeth and at least two cam surfaces for respectively producing such up-and-down pivotal movement of the pickup arm and such pivotal movement of the pickup arm across the turntable surface; a pinion rotatably mounted for driving engagement with said ring of teeth, the ring of teeth having, at a predetermined point of its circumference, a gap between successive teeth which allows said pinion when facing said gap in a rest position of the cam gear to rotate without driving the cam gear; means for driving said pinion in a predetermined direction to drive the cam gear in a forward direction; trip means operable to produce movement of the cam gear in said forward direction from said position of rest, for an angle sufficient to ensure engagement of said pinion with the teeth of said ring of teeth, and indexing means for opposing movement of the cam gear from said position of rest, wherein said cam surface controlling the up-and-down movement of the pickup-arm includes a first ramp, operative, during an initial part of the forward rotation of the cam gear from said rest position, to raise said arm away from the turntable surface to a raised position, a holding portion following this first ramp and operative to hold the arm in said raised position, and a second ramp, following said holding portion and operative, during a final part of the cam-gear movement before the rest position is reached again, to allow the arm to move down again from said raised position; and wherein said gap in said ring of teeth extends to said rest position from a point of said ring of teeth which faces the pinion when the pickup-arm position is controlled by a point of said cam surface just preceding the beginning of said second ramp when the cam gear rotates in the forward direction, the mechanism further including: a spring-loaded bias member; co-operating cam means on said cam gear and said bias member which cause said bias member to increase the loading of the spring of said bias member during the part of the forward movement of the cam gear preceding the exposure of said tooth gap to the pinion, and to utilise the energy stored thereby in the spring for moving the cam gear to said rest position subsequently to said exposure; means resiliently indexing the cam gear in said rest position; a cueing member operable, when the cam gear is in said rest position, to rotate the cam gear in a reverse direction, opposite to said forward direction, by an amount sufficient for said second ramp to move the pickup arm to said raised position, whereby the spring loading of said bias means is increased, whereafter release of said control member permits the spring loading of said bias member to return the cam gear in said forward direction to its rest position; and viscous-liquid damping means, operative to control the speed of rotation of the cam gear when said gear is rotated by the release of energy stored by said spring.

4. A control mechanism for use in a disc-record player having a unit plate, a motor-driven turntable mounted on said unit plate for rotation about a vertical axis, a pickup arm, a pickup-arm carrier structure on which said pickup arm is mounted for pivotal movement towards and away from the surface of said turntable, said pickup-arm carrier structure being equipped with a pickup-arm spindle mounted in said unit plate for pivotal movement to move the pickup arm across the turntable, and extending through the unit plate to project beyond the lower side thereof, a pickup-arm lifting element, also extending to a point below said unit plate, and a plurality of manually operable input elements which include a manually operable cueing member, mounted on the unit plate, said control mechanism comprising: a mounting structure adapted for attachment to the underside of the unit plate of such player without contact with said pickup-arm spindle and said lifting element; a cam gear, wholly supported in said mounting structure and having a ring of teeth and at least two cam surfaces for respectively producing pivotal movement of the pickup-arm of said player towards and away from the turntable surface, and across the turntable towards and away from the turntable axis; a pinion rotatably mounted in, and wholly supported by, said mounting structure for driving engagement with the ring of teeth of the cam gear, said ring being arranged to have, at a predetermined portion of its circumference, a gap between successive teeth, wide enough to allow the pinion to rotate, when facing the said gap, without driving the cam gear, and said pinion is mounted at a distance from the turntable axis, to rotate the pinion in such direction as to drive therethrough the cam gear in a predetermined forward direction; cam-follower members, wholly supported in said mounting structure, for respective co-operation with said cam surfaces of the cam gear; trip means for producing rotary displacement of said cam gear in the forward direction from a position in which said pinion faces the gap in the ring of teeth of the cam gear, by an angle sufficient to cause said pinion to engage the gear teeth of said ring; and a plurality of control members, each wholly suppoted in said mounting structure for respective operative link connection to such input elements to vary the operation of the control mechanism in accordance with the respective positions of such input elements; means determining an indexing position of the cam gear; and loaded spring means whose loading is arranged to be increased by the rotation of the cam gear when the latter is driven by said pinion in a forward direction during part of a revolution of the cam gear from said indexing position and to transmit forward driving power to the cam gear during a subsequent final part of such revolution in which the cam gear causes lowering of the pickup arm to permit the playing of a record, said control members including a pivotally mounted cueing lever for operative linkage connection to such cueing member, said cueing lever being arranged to normally be in an inactive position and, when displaced from said inactive position by the operation of such manually operable lever, to cause rotation of the cam gear in the reverse direction, opposite to said normal direction, from said indexing position, through an angle sufficient to effect lifting of the pickup arm, and thereby to produce an increase in the loading of said spring means, whereafter the restoration of the manually operable lever to free said cueing lever will allow energy stored in said spring means during said reverse-direction rotation of the cam gear to rotate the cam gear in the forward direction to return to its indexing position, thereby effecting lowering of the pickup arm.

5. Mechanism as claimed in claim 4, wherein the cam gear has an abutment and the cueing lever has a cam surface which, when the cueing lever is thus moved from its inactive position when the cam gear is in its indexing position, will engage said abutment to produce reverse rotation of the cam gear.

6. Mechanism as claimed in claim 4, which includes viscous-liquid damping means for the rotation of the cam gear.

7. Mechanism as claimed in claim 6, wherein the mounting structure is formed with a cup-shaped part open at the upper side, and the cam gear is axially movable and is provided at its underside with a coaxial boss projecting into said cup-shaped part, the mechanism further including a porous disc member impregnated with viscous liquid and interposed between the bottom of the cup and the end surface of the said boss, and spring means interposed between the cam gear and the mounting structure for pressing the main cam gear axially towards said bottom.

8. A record player comprising in combination: a unit plate; a motor-driven turntable mounted on said unit plate for rotation about a vertical axis; a pickup arm; a pickup-arm carrier structure on which said pickup arm is mounted for pivotal movement towards and away from the surface of said turntable, said pickup-arm carrier structure being equipped with a pickup-arm spindle mounted in said unit plate for pivotal movement to move the pickup arm across the turntable, and extending through the unit plate to project beyond the lower side thereof; a pickup-arm lifting element, also extending to a point below said unit plate; a plurality of manually operable input elements; control mechanism secured to the underside of said unit plate for mechanical co-operation with the pickup-arm spindle and pickup-arm lifting means and including a mounting structure attached to the underside of said unit plate without contact with said pickup-arm spindle and said lifting element; a cam gear, wholly supported in said mounting structure and having a ring of teeth and at least two cam surfaces for respectively producing pivotal movement of the pickup-arm of said player towards and away from the turntable surface, and across the turntable towards and away from the turntable axis; a pinion rotatably mounted in, and wholly supported by, said mounting structure for driving engagement with the ring of teeth of the cam gear, said ring being arranged to have, at a predetermined portion of its circumference, a gap between successive teeth, wide enough to allow the pinion to rotate, when facing the said gap, without driving the cam gear, and said pinion having driving means operative, when the axis of said pinion is mounted at a distance from the turntable axis, to rotate the pinion in such direction as to drive therethrough the cam gear in a predetermined forward direction; cam-follower members, wholly supported in said mounting structure, for respective co-operation with said cam surfaces of the cam gear; trip means for producing rotary displacement of said cam gear in the forward direction from a position in which said pinion faces the gap in the ring of teeth of the cam gear, by an angle sufficient to cause said pinion to engage the gear teeth of said ring; and a plurality of control members, each wholly supported in said mounting structure, for varying the operation of the control mechanism; linkage elements respectively connecting said control elements with associated control members of said control mechanism and connecting one of said cam-followers with the pickup-arm spindle for transmitting rotary movements to said spindle during revolution of the cam gear; a turntable motor, from which the turntable is belt-driven, the turntable having a coaxial toothed pulley, the pinion of said control mechanism being also provided with a toothed pulley, and the mechanism including a toothed belt by which the toothed pulleys of the turntable and of said pinion are drivingly connected.

9. A disc-record player comprising in combination: a unit plate; a motor-driven turntable mounted on said unit plate for rotation about an axis perpendicular thereto and having a record-supporting surface; a pickup arm; a pickup-arm carrier structure on which said pickup arm is mounted for pivotal up-and-down movement away from and towards said record-supporting surface, said pickup-arm carrier structure being equipped with a pickup-arm spindle extending through the unit plate for pivotal operation to move the pickup arm across the turntable; a pickup-arm lifting element, also extending through the unit plate, for operation to produce such pivotal up-and-down movement of the pickup arm; and control mechanism operatively connected to said turntable and pickup arm comprising: a cam gear having a ring of teeth and two cam surfaces which are rotatable with the cam gear and include a first cam surface controlling such up-and-down pivotal movement of the pickup arm and second cam surface controlling such pivotal movement of the pickup arm across the record supporting surface; a pinion rotatably mounted for driving engagement with said ring of teeth, the ring of teeth having, at a predetermined point of its circumference, a gap between successive teeth, wide enough to allow said pinion when facing said gap to rotate without driving the cam gear, said gap determining a position of rest for the cam gear; means for driving said pinion in a predetermined direction determining a forward direction in which the cam gear is driven by said pinion; trip means operable to produce movement of the cam gear in said forward direction from said position of rest through an angle sufficient to ensure engagement of said pinion with the teeth of said ring of teeth; and indexing means for opposing movement of the cam gear from said position of rest, - wherein the said first cam surface has a first ramp, operative, during the initial part of the forward rotation of the cam gear from a said position of rest, for lifting the arm away from said record supporting surface to a raised position, a holding portion, following this first ramp and operative, during a subsequent part of such forward rotation, to maintain the arm in said raised position, a second ramp, following said holding portion and operative after said holding portion, during a final part of the cam-gear movement before said position of rest is reached again, to allow the arm to move down from said raised position towards the surface, the said first cam surface being so arranged that when the cam gear is in said position of rest, its said first cam surface can, while said pinion faces said gap, be rotated from said position of rest in a reverse direction, opposite to said forward direction, by an amount sufficient for said second ramp to move the pickup arm to said raised position, the mechanism further including a cueing member operable when the cam gear is in said position of rest, to produce such rotation of said first cam surface in said reverse direction; return spring means for returning said first cam to the said position of rest in said forward direction when said cueing member is released; and damping means operative to damp such return movement.

* * * * *